Patented Sept. 7, 1954

2,688,625

UNITED STATES PATENT OFFICE 2,688,625

2,2′-ALKYLIDENEBIS (4-ALKOXY- 6 -VINYL-PHENOLS), DERIVATIVES THEREOF, AND COMPOSITIONS STABILIZED THEREWITH

Alan Bell and M. B. Knowles, Kingsport, Tenn., assignors to Eastman Kodak Company, Rochester, N. Y., a corporation of New Jersey No Drawing. Application April 29, 1953, Serial No. 352,048

20 Claims. (Cl. 260—398.5)

This invention relates to the stabilization of fats, oils and other organic materials which are subject to deterioration employing 2,2′-alkylidenebis (4-alkoxy-6-vinylphenols) and derivatives containing substituents on the vinyl radicals, e. g. where the 6-positions are occupied by propenyl radicals.

It is an object of our invention to provide novel antioxidants possessing improved properties which are particularly useful in the stabilisation of fats and oils. Another object of our invention is to provide such antioxidants which are relatively insoluble in aqueous media but which are soluble in fats, oils and various organic solvents whereby such antioxidants have improved carry-over properties when a fat or oil stabilized therewith is employed in preparing cooked foods. It is a further object of our invention to provide a process for preparing such compounds. An additional object concerns the providing of compounds which are quite stable towards heat whereby they are useful where an oil or fat is employed in cooking at high temperatures or where an oil is employed as a lubricant or for other purposes at high temperatures. Other objects will become apparent hereinafter.

Compounds known in the prior art include those which can be represented by the following general formula:

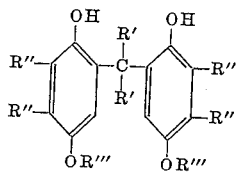

wherein each R′ represents an H atom or a lower alkyl radical, each R″ represents an H atom, an alkyl or arylalkyl radical and each R‴ represents an H atom or an alkyl radical. The compounds encompassed within this general formula are known to be useful as oxidation inhibitors and antioxidants for various compounds and compositions. The prior art indicates that such compounds can be prepared by condensing a 4-alkoxyphenol or derivative thereof with an aldehyde or a ketone, in the presence of an acidic catalyst. Examples of such compounds include 2,2′-methylenebis (4-methoxy-6-propylphenol. Compounds such as 2,2′-methylenebis (4-methoxy-6-allylphenol) are not any more effective in most instances as an antioxidant than the 6-propyl derivative or various other derivatives containing miscellaneous alkyl groups in the 6-position.

Quite unexpectedly, we have found, for example, that when the 6-position is occupied by a propenyl radical there is a very unusual and pronounced increase in the antioxidant effectiveness. Thus, 2,2′-methylenebis (4-methoxy-6-propenylphenol) is an example of one of the outstanding antioxidants encompassed within the scope of our invention. The following Table I illustrates the unusual effectiveness of one example of this group of novel antioxidants in comparison with the allyl isomer, in comparison with the closely related propyl analog, and in comparison with the well known commercial antioxidant commonly referred to as BHA which is a mixture of the 2-isomer and the 3-isomer of tert. butyl-4-hydroxyanisole.

TABLE I

| Antioxidant Compound | Concentration (percent) | AOM value in Lard A (hours) |
|---|---|---|
| None (Control) | 0 | 8.0 |
| BHA | 0.01 | 28.0 |
|  | 0.02 | 31.0 |
| 2,2′-methylenebis (4-methoxy-6-propyl-phenol) | 0.02 | 28.0 |
| 2,2′-methylenebis(4-methoxy-6-allylphenol) | 0.02 | 29.5 |
| 2,2′-methylenebis(4-methoxy-6-propenyl-phenol) | 0.02 | 52.0 |

These data as tabulated are based on an evaluation conducted employing samples of lard from the same blended mass as the substrate and the well known "active oxygen method" (AOM) which is described more in detail in the literature. In brief, the "active oxygen method" of conducting tests consists of preparing a weighed quantity of the compound to be tested and dissolving the same in the fat or oil being employed as a substrate together with any synergistic compound when the latter is deemed desirable. The resulting solution of the fat or oil in a glass container is then placed in a hot water bath at 99° C. (210° F.) and air is then bubbled into the container through the solution at a rate of approximately 2.3 ml. per second. Periodically, a portion of the test solution is removed and the peroxide content quantitively determined by iodometric titration, expressing the results as milliequivalents per kilogram of fat or oil. Experience has shown that initial rancidity in lard corresponds closely to a peroxide value of about 20 milliequivalents. A control containing no additives is run simultaneously with the test compound to determine the induction period of the unstabilized fatty material. The final results are expressed as the number of hours required for rancidity to develop; i. e. an AOM value of 25 for a sample of lard means that 25 hours was required to form twenty milliequivalents of peroxide per kilogram of lard.

As is readily apparent from a perusal of the above tabulation, the AOM value for the 2,2'-methylenebis (4-methoxy-6-propenylphenol) is close to twice that for the corresponding 6-propyl derivative. The AOM value for the propyl derivative is approximately the same as that for the allyl derivative and for the well known antioxidant BHA.

According to our invention, we have found that compounds having the following general formula are valuable antioxidants, especially for fats and oils:

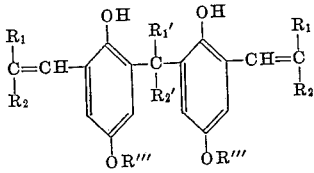

wherein each of $R_1$ and $R_2$ represents an H atom, a methyl or an ethyl radical, each of $R_1'$ and $R_2'$ represents an H atom or a lower alkyl radical containing from 1 to 6 carbon atoms, and each $R'''$ represents an alkyl radical containing from 1 to 6 carbon atoms. Most advantageously each $R_1$ and $R'''$ represents a methyl radical and each of $R_2$, $R_1'$ and $R_2'$ represents a hydrogen atom.

The following example illustrates the preparation of 2,2'-methylenebis (4-alkoxy-6-prophenylphenols) by first preparing the corresponding 2,2'-methylenebis (4-alkoxy-6-allylphenol) and isomerizing to convert the allyl radicals to propenyl radicals.

*Example 1*

A mixture of 164 g. (1.0 mole) of 2-allyl-4-methoxyphenol, 200 ml. of benzene, 10 g. (0.33 mole) of paraformaldehyde, 3 ml. of concentrated hydrochloric acid, and 5 drops of thioglycolic acid was stirred for 15 hours. The benzene solution was washed free of acid, the solvent was removed and the residue distilled. A substantial proportion of the 2-allyl-4-methoxyphenol was recovered. This product (36 g.) distilled at 213–220° C. under a pressure of 2 mm. of Hg. This product was crystallized first from of a solution of acetic acid in water, then it was crystallized twice from hexane whereby a white product was obtained which melted at 49.2–56.0° C. Ten grams of this product was dissolved in a solution containing 100 g. of potassium hydroxide pellets and 2 g. of triethanolamine in 50 ml. of water at a temperature of 130° C. under an atmosphere of nitrogen with continuous stirring. These conditions were maintained for 1 hour following which the hot mixture was poured over ice and then acidified with hydrochloric acid. The solid which separated was recrystallized several times from hexane and from a solution of acetic acid in water. The product obtained had a melting point 100.4–104.6° C. The empirical formula is $C_{21}H_{26}O_4$ which theoretically contains 74.09 percent carbon and 7.11 percent hydrogen. Upon analysis, the product obtained was found to contain 73.47 percent carbon and 7.18 percent hydrogen. A second analysis indicated that the product contained 73.77 carbon and 7.22 percent hydrogen. This product was 2,2'-methylenebis (4-methoxy-6-propenylphenol).

The process described for preparing 2,2'-methylenebis (4-methoxy-6-allylphenol) can be readily changed by substituting an equimolecular quantity of 2-allyl-4-propoxyphenol or other alkyl ethers of 2-allyl hydroquinone whereby the products obtained are the corresponding homologs of that described above, e. g. 2,2'-methylenebis (4-propoxy-6-propenylphenol), etc.

In addition to employing paraformaldehyde, formaldehyde and other aldehydes can be similarly employed with suitable procedural modifications. Most advantageously, paraformaldehyde is employed. When employing an aldehyde other than paraformaldehyde, it is advantageous to include a dehydrating agent in the reaction mixture, e. g. calcium chloride, zinc chloride, sodium sulfate, etc.

Other mineral acids can be employed as the condensation catalyst besides hydrochloric acid, e. g. hydrobromic acid, sulfuric acid, etc. Similarly, other mercapto acids can be employed as promoters, in addition to thioglycolic acid, e. g. the homologs thereof.

The reaction temperature can be varied within wide limits from about 0° C. to about 80° C. although it is most advantageous to employ a temperature from about 20° C. to about 50° C. Room temperature is generally satisfactory.

The isomerization of the allyl compounds to form the propenyl compound can be conducted in any manner known in the art. The process disclosed can be modified considerably employing other alkali metal hydroxides, other amines, various proportions of water, other inert atmospheres, etc. The neutralization can be accomplished with other acids in lieu of hydrochloric acid, e. g., sulfuric acid, etc.

In order to illustrate the usefulness of the compounds of our invention in the stabilization of fats and oils and their comparative properties in regard to related compounds, the following additional antioxidants were also prepared by processes similar to that employed in the preparation of 2,2'-methylenebis (6-allyl-4-methoxyphenol).

*Example 2.—Preparation of 2,2'-methylenebis (4-methoxyphenol)*

Forty-one and seven-tenths grams (0.5 mole) of 36 percent formaldehyde solution was added portionwise to a stirred mixture of 500 ml. of benzene, 248 g. (2.0 moles) of 4-methoxyphenol, 20 g. of calcium chloride, 2 ml. of concentrated hydrochloric acid, and 5 drops of thioglycolic acid. The temperature was maintained at 22–34° C. during the addition and was raised to 50° C. for a few minutes after the addition. After allowing to stand overnight, water was added and the organic layer separated and then washed free of acid. The solvent was removed and the residue then distilled in vacuo. One-half of the 4-methoxyphenol was recovered as a first fraction. The second fraction boiled at 211–234° C. (2–3 mm.) and weighed 36.5 g. Considerable polymeric residue was left. The second fraction was dissolved in a benzene-hexane mixture and allowed to stand until crystals formed. Nineteen grams (7.2 percent) of product, melting at 84.4–85.5° C., was obtained. The melting point was not changed appreciably by further recrystallization from benzene-hexane. Anal.: Calcd. for $C_{15}H_{16}O_4$: C, 69.23; H, 6.15. Found: C, 68.80, 68.96; H, 6.28, 6.35.

*Example 3.—Preparation of 2,2'-n-butylidenebis (4-methoxyphenol)*

A mixture of 248 g. (2.0 moles) of 4-methoxyphenol, 36 g. (0.5 mole) of n-butyraldehyde, 20 g. of calcium chloride, 500 ml. of benzene, 1 ml. of concentrated hydrochloric acid, and 5 drops of thioglycolic acid was stirred at room temperature for two hours. The temperature was then raised to 45° C. for a few minutes and finally let stir overnight at room temperature. The organic layer was washed free of acid, the solvent removed and the residue then distilled in vacuo. There was obtained 55 percent of 4-methoxyphenol and 101.5 g. of material boiling at 210–258° C. (2–4 mm.). The latter material was dissolved in a hot hexane-benzene mixture and the solution allowed to stand. Fine needle-like crystals formed after several hours; after recrystallization from hexane-benzene again, the product melted at 95.6–99.4° C. and weighed 45 g. (33 percent yield). Anal.: Calcd. for $C_{18}H_{22}O_4$: C, 71.49; H, 7.34. Found: C, 71.37, 71.51; H, 7.34, 7.44.

*Example 4.—Preparation of 2,2'-isobutylidenebis (4-methoxyphenol)*

This product was prepared in 36 percent yield following the procedure in Example 2 but using isobutyraldehyde instead of n-butyraldehyde; 56 percent of the 4-methoxyphenol was recovered. It melted at 136.6–138.0° C. and boiled at 191–206° C. (2–3 mm.). Anal.: Calcd. for $C_{18}H_{22}O_4$: C, 71.52; H, 7.28. Found: C, 71.05, 71.32; H, 7.46, 7.48.

*Example 5.—Preparation of 2,2'-isotbuylidenebis (5-tert-butyl-4-methoxyphenol)*

A mixture of 300 ml. of benzene, 180 g. (1.0 mole) of 3-tert-butyl-4-methoxyphenol, 18 g. (0.25 mole) of isobutyraldehyde, 20 g. of calcium chloride, 5 ml. of concentrated hydrochloric acid, and 10 drops of thioglycolic acid was stirred for fifteen hours. The benzene layer was decanted from the calcium chloride and then partially distilled in vacuo. Seventy-eight grams of 3-tert-butyl-4-methoxyphenol was distilled off leaving a light cream colored, crystalline residue. The residue was crystallized from acetic acid-water giving 85 g. (82 percent yield) of product melting at 179–184° C. Anal.: Calcd. for $C_{26}H_{38}O_4$: C, 75.36; H, 9.17. Found: C, 75.19, 75.16; H, 9.42, 9.35.

Other compounds which can be prepared in a similar manner include 2,2'-methylenebis (5-tert-butyl-4-methoxyphenol), 2,2'-methylenebis (6-tert-butyl-4-methoxyphenol), etc.

These various compounds were tested according to the "active oxygen method" employing lard as the substrate whereby the results depicted in the following Table II were obtained. Data is also presented in this table regarding the AOM values of BHA which is defined above and which is a well known commercial antioxidant.

TABLE II

| Antioxidant Compound | Concentration (percent) | AOM value in Lard B (hours) |
|---|---|---|
| None (Control) | 0 | 13.0 |
| BHA | 0.01 | 24.0 |
| | 0.02 | 26.5 |
| 2,2'-methylenebis(4-methoxyphenol) | 0.01 | 25.5 |
| | 0.02 | 31.0 |
| 2,2'-n-butylidene-bis(4-methoxyphenol) | 0.01 | 25.5 |
| | 0.02 | 30.0 |
| 2,2'-isobutylidene-bis(4-methoxyphenol) | 0.01 | 29.0 |
| | 0.02 | 34.0 |
| 2,2'-isobutylidene-bis(5-tert-butyl-4-methoxyphenol) | 0.01 | 17.0 |
| | 0.02 | 20.0 |

The lard employed in the tests whose results are tabulated in Table II was a different blended mass from that used for Table I, however, a comparison of the AOM values for the control tests shows that the results are closely comparable. The 2,2'-alkylidenebis (4-alkoxyphenols) are, generally speaking, valuable antioxidants for various kinds of fats and oils. As has been pointed out hereinabove, the compounds of this invention are of unexpectedly superior utility. These compounds are water insoluble and hence have good carry-over properties in regard to the preparation of cooked foods prepared from fats and oils containing these antioxidants. These compounds are also soluble in fats and oils, and hence are readily usable without addition of a solubilizing agent. They are quite stable towards heat and are, therefore, useful where the fat or oil is used in cooking. Similarly, these compounds are also useful in the stabilization of motor fuels, turbine oils, plastics, etc. Moreover, many of the numerous compounds set forth in this specification have attributes which are useful as antistain agents in the formulation of photographic developer compositions. Certain aspects of this matter are set forth in another application.

When employed as antioxidants in accordance with this invention, fractions of a percent of 2,2'-methylenebis (4-alkoxy-6-vinylphenols) or derivatives thereof can be incorporated into such fats and oils as lard, cottonseed oil, etc., by admixing the antioxidant whereby a solution of the antioxidant in the substrate is obtained. Alternatively, the antioxidant can be blended with suitable solvents to form an antioxidant solution. Examples of such solvents include glycerin and propylene glycol. Such antioxidant solutions can be readily dissolved in the fat or oil to be stabilized with less necessity for prolonged mixing of the fat or oil with the undissolved antioxidant. Similarly, synergists can be admixed with the fats or oils along with the dry antioxidant compounds of this invention or, in order to facilitate the incorporation of the antioxidant and synergist into the fat or oil, they can both be dissolved in such solvents as propylene glycol, glycerin, or other similar solvents which are inert insofar as concerns both the antioxidant and/or the synergist components in the ultimately prepared stabilized fat or oil. Examples of synergists which can be employed include citric acid, tartaric acid, phosphoric acid, ascorbic acid, alanine, cysteine, etc. In addition to the employment of a single antioxidant as described hereinbefore, mixtures of two or more such antioxidants together with two or more synergists can be employed. Moreover, other antioxidants which are known in the art can be added for their supplemental effects if such be desired, e. g. BHA, propyl gallate, NDGA (nordihydroguaiaretic acid), etc.

In addition to the fats and oils mentioned above which can be stabilized by the antioxidants of this invention, other representative fats and oils include linseed oil, menhaden oil, cod liver oil, castor oil, olive oil, rape seed oil, cocoanut oil, palm oil, corn oil, sesame oil, peanut oil, babassu oil, butter fat, beef tallow, etc., as well as hydrogenated oils and fats prepared from any of the foregoing. Furthermore, various other oils and fats may be similarly treated within the scope of this invention. In addition, the antioxidants of this invention can be employed in certain instances to stabilize fuels, rubber, waxes, plastic compositions, etc.

Inasmuch as it is well known in the art to employ antioxidants in the stabilization of fats and oils, it is not believed necessary to give numerous specific examples of how the antioxidants of this invention are blended with fats or oils nor the specific proportions which can be employed in the many possible examples which would come within the scope of the description given hereinabove. The tabulation of data presented in Table I illustrates the employment of an antioxidant of this invention. It is obvious how the other antioxidants coming within the scope of this invention can be similarly advantageously employed, e. g. 2,2'-methylenebis (6-propenyl-4-butoxyphenol), etc. The proportions employed can be varied advantageously from about 0.0001% to about 1.0% based on the weight of antioxidant in the substrate. Most advantageously proportions of from about 0.001% to about 0.1% can be employed. Synergists can be advantageously employed in proportions which are generally less than the proportion of the antioxidant and can be varied from about 0.0001% to about 0.1% by weight.

The following examples will serve to further illustrate other antioxidants coming within the scope of this invention which can be advantageously employed, e. g. 2,2-alkylidenebis (4-alkoxy-6-vinylphenols) and derivatives thereof containing substituents on the vinyl radicals such as where the 6-positions are occupied by propenyl radicals.

*Example 6.—Preparation of 2,2'-isobutylidenebis (4-methoxy-6-propenylphenol)*

A solution of 0.5 mole of the 2,2'-isobutylidenebis (4-methoxy-6-propenylphenol), 300 ml. of methanol, and 76.5 g. (1.0 mole) of allyl chloride was heated to boiling and then treated dropwise with 40 g. (1.0 mole) of sodium hydroxide as a 40% aqueous solution. The addition of alkali was made at a rate required to maintain gentle refluxing without the air of external heat. After the alkali had been added, refluxing was continued for three hours. The cooled reaction mixture was diluted with water and then extracted with a low-boiling petroleum ether. The extract was washed first with dilute alkali then with water and finally the solvent was removed, leaving a residue of almost pure diallyl ether of 2,2'-isobutylidenebis (4-methoxy-6-propenylphenol). The ether was mixed with 50 ml. of dimethylaniline and the resulting solution was then heated at 215–220° for two hours to cause rearrangement of the allyl groups. After cooling, ether was added and the solution extracted with dilute hydrochloric acid to remove the dimethylaniline. Evaporation of the ether left a mush which was recrystallized from petroleum ether to give pure 2,2'-isobutylidenebis (4-methoxy-6-propenylphenol). The allyl group was isomerized into a propenyl group by heating approximately 25 g. of the compound with 100–200 g. of 65% aqueous potassium hydroxide, under an inert atmosphere, for 2 hours at 135–160° C. Two layers, or a solid, formed during this treatment. The main portion was potassium hydroxide which was drawn off while hot, leaving the phenol as its potassium salt. Dilute hydrochloric acid was added to decompose the salt leaving a solid 2,2'-isobutylidenebis (4-methoxy-6-propenylphenol), which was purified by recrystallizing from petroleum ether. The yield obtained was about 10%. It melted at 160–6° C. Analysis: Calcd. for $C_{24}H_{30}O_4$: C, 75.4; H, 7.9. Found: C, 75.8; H, 8.1.

*Example 7.—Preparation of 2,2'-n-butylidenebis (4-methoxy-6-propenylphenol)*

A solution of 0.5 mole of the 2,2'-n-butylidenebis (4-methoxy-6-propenylphenol), 300 ml. of methanol, and 76.5 g. (1.0 mole) of allyl chloride was heated to boiling and then treated dropwise with 40 g. (1.0 mole) of sodium hydroxide as a 40% aqueous solution. The addition of alkali was made at a rate required to maintain gentle refluxing without the aid of external heat. After the alkali had been added, refluxing was continued for three hours. The cooled reaction mixture was diluted with water and then extracted with a low-boiling petroleum ether. The extract was washed first with dilute alkali then with water and finally the solvent was removed, leaving a residue of almost pure diallyl ether of 2,2'-n-butylidenebis (4-methoxy-6-propenylphenol). The ether was mixed with 50 ml. of dimethylaniline and the resulting solution was then heated at 215–220° for two hours to cause rearrangement of the allyl groups. After cooling, ether was added and the solution extracted with dilute hydrochloric acid to remove the dimethylaniline. Evaporation of the ether left a mush which was recrystallized from petroleum ether to give pure 2,2'-n-butylidenebis (4-methoxy-6-propenylphenol). The allyl group was isomerized into a propenyl group by heating approximately 25 g. of the compound with 100–200 g. of 65% aqueous potassium hydroxide, under an inert atmosphere, for 2 hours at 135–160° C. Two layers, or a solid, formed during this treatment. The main portion was potassium hydroxide which was drawn off while hot, leaving the phenol as its potassium salt. Dilute hydrochloric acid was added to decompose the salt leaving a solid 2,2'-n-butylidenebis (4-methoxy-6-propenylphenol) which was purified by recrystallizing from petroleum ether. The yield obtained was about 10%. It melted at 140–150° C. Analysis: Calcd. for $C_{24}H_{30}O_4$: C, 75.5: H, 7.9. Found C, 76.2; H. 8.3.

*Example 8.—Preparation of 2,2'-isobutylidenebis (4-isopropoxy-6-propenylphenol)*

A solution of 0.5 mole of the 2,2'-isobutylidenebis (4-isopropoxy-5-propenylphenol), 300 ml. of methanol, and 76.5 g. (1.0 mole) of allyl chloride was heated to boiling and then treated dropwise with 40 g. (1.0 mole) of sodium hydroxide as a 40% aqueous solution. The addition of alkali was made at a rate required to maintain gentle refluxing without the aid of external heat. After the alkali had been added, refluxing was continued for three hours. The cooled reaction mixture was diluted with water and then extracted with a low-boiling petroleum ether. The extract was washed first with dilute alkali then with water and finally the solvent was removed, leaving a residue of almost pure diallyl ether of 2,2'-isobutylidenebis (4-isopropoxy-6-propenylphenol). The ether was mixed with 50 ml. of dimethylaniline and the resulting solution was then heated at 215–220° for two hours to cause rearrangement of the allyl groups. After cooling, ether was added and the solution extracted with dilute hydrochloric acid to remove the dimethylaniline. Evaporation of the ether left a mush which was recrystallized from petroleum ether to give pure 2,2' - isobutylidenebis (4 - isopropoxy-6-propenylphenol). The allyl group was isomerized into a propenyl group by heating approximately 25 g. of the compound with 100–200 g. of 65% aqueous potassium hydroxide, under an inert atmosphere, for 2 hours at 135–160° C. Two layers or a solid, formed during this treatment. The main portion was potassium hydroxide which was drawn off while hot, leaving the phenol as its potassium salt. Dilute hydrochloric acid was added to decompose the salt leaving a solid 2,2'-isopropoxy-6-propenylphenol) which was purified by recrystallizing from petroleum ether. The yield obtained was about 9%. It melted at 171–179° C. Analysis: Calcd. for $C_{28}H_{38}O_4$: C, 76.6; H, 8.7. Found: C, 77.0; H, 8.9.

*Example 9.—Preparation of 2,2'-isobutylidenebis (4-n-butoxy-6-propenylphenol)*

A solution of 0.5 mole of the 2,2'-isobutylidenebis (4-n-butoxy-6-propenylphenol), 300 ml. of methanol, and 76.5 g. (1.0 mole) of allyl chloride was heated to boiling and then treated dropwise with 40 g. (1.0 mole) of sodium hydroxide as a 40% aqueous solution. The addition of alkali was made at a rate required to maintain gentle refluxing without the aid of external heat. After the alkali had been added, refluxing was continued for three hours. The cooled reaction mixture was diluted with water and then extracted with a low-boiling petroleum ether. The extract was washed first with dilute alkali then with water and finally the solvent was removed, leaving a residue of almost pure diallyl ether of 2,2'-isobutylidenebis (4-n-butoxy-6-propenylphenol). The ether was mixed with 50 ml. of dimethylaniline and the resulting solution was then heated at 215–220° for two hours to cause rearrangement of the allyl groups. After cooling, ether was added and the solution extracted with dilute hydrochloric acid to remove the dimethylaniline. Evaporation of the ether left a mush which was recrystallized from petroleum ether to give pure 2,2'-isobutylidenebis (4 - n - butoxy - 6 - propenylphenol). The allyl group was isomerized into a propenyl group by heating approximately 25 g. of the compound with 100–200 g. of 65% aqueous potassium hydroxide, under an inert atmosphere, for 2 hours at 135–160° C. Two layers, or a solid, formed during this treatment. The main portion was potassium hydroxide which was drawn off while hot, leaving the phenol as its potassium salt. Dilute hydrochloric acid was added to decompose the salt leaving a solid 2,2'-isobutylidenebis (4-n-butoxy-6-propenylphenol) which was purified by recrystallizing from petroleum ether. The yield obtained was about 5%. It melted at 136–143° C. Analysis: Calcd. for $C_{30}H_{42}O_4$: C, 78.3; H, 9.0. Found: C, 78.9; H, 9.3.

The various antioxidant compounds prepared in accordance with Examples 6 through 9 were tested according to the "active oxygen method" employing lard as the substrate whereby the results depicted in the following Table III were obtained. The lard used in conducting these tests had a response similar to that of the lard employed in obtaining the data presented in Table I. The batch of lard used in each instance had an AOM value in the absence of any antioxidant of 8.0 hours.

TABLE III

| Antioxidant Compound | Concentration (percent) | AOM value in Lard O (hours) |
|---|---|---|
| Control | | 8 |
| 2,2'-isobutylidenebis(4-methoxy-6-propenylphenol) | 0.02 | 50 |
| 2,2'-n-butylidenebis(4-methoxy-6-propenylphenol) | 0.02 | 50 |
| 2,2'-isobutylidenebis(4-isopropoxy-6-propenylphenol) | 0.02 | 48 |
| 2,2'-isobutylidenebis(4-n-butoxy-6-propenylphenol) | 0.02 | 52 |

It is apparent from a comparison of Table I and Table III that the compounds set forth in Table III have the same order of antioxidant effectiveness as 2,2'-methylenebis (4-methoxy-6-propenylphenol) which is set forth in Table I. Accordingly, all of the compounds presented in Table III are clearly suprisingly more efficient antioxidants than the antioxidants known in the prior art such as BHA.

We claim:

1. Stabilized fats and oils containing from about 0.001 percent to about 1.0 percent by weight of an antioxidant selected from those having the following formula:

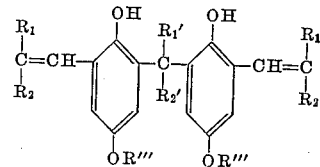

wherein each of $R_1$ and $R_2$ represents a member selected from the group consisting of an H atom, a methyl and an ethyl radical, each of $R_1'$ and $R_2'$ represents a member selected from the group consisting of an H atom and a lower alkyl radical containing from 1 to 6 carbon atoms, and each $R'''$ represents an alkyl radical containing from 1 to 6 carbon atoms.

2. Stabilized fats and oils as defined in claim 1 wherein the antioxidant is 2,2'-methylenebis (4-methoxy-6-propenylphenol).

3. Stabilized fats and oils as defined in claim 1 wherein the antioxidant is 2,2'-isobutylidenebis (4-methoxy-6-propenylphenol).

4. Stabilized fats and oils as defined in claim 1 wherein the antioxidant is 2,2'-isobutylidenebis (4-isopropoxy-6-propenylphenol).

5. Stabilized fats and oils as defined in claim 1 wherein the antioxidant is 2,2'-n-butylidenebis (4-methoxy-6-propenylphenol).

6. Stabilized fats and oils as defined in claim 1 wherein the antioxidant is 2,2'-isobutylidenebis (4-n-butoxy-6-propenylphenol).

7. A process for stabilizing fats and oils which comprises admixing therewith from about 0.001 percent to about 0.1 percent by weight of an antioxidant selected from those having the following formula:

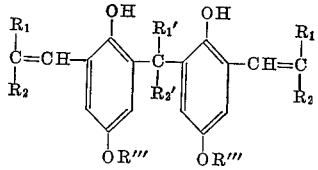

wherein each of $R_1$ and $R_2$ represents a member selected from the group consisting of an H atom, a methyl and an ethyl radical, each of $R_1'$ and $R_2'$ represents a member selected from the group consisting of an H atom and a lower alkyl radical containing from 1 to 6 carbon atoms, and each $R'''$ represents an alkyl radical containing from 1 to 6 carbon atoms.

8. A process for stabilizing fats and oils as defined in claim 7 wherein the antioxidant is 2,2'-methylenebis (4-methoxy-6-propylphenol).

9. A process for stabilizing fats and oils as defined in claim 7 wherein the antioxidant is 2,2'-isobutylidenebis (4-methoxy-6-propenylphenol).

10. A process for stabilizing fats and oils as defined in claim 7 wherein the antioxidant is 2,2'-isobutylidenebis (4-isopropoxy-6-propenylphenol).

11. A process for stabilizing fats and oils as defined in claim 7 wherein the antioxidant is 2,2'-n-butylidenebis (4-methoxy-6-propenylphenol).

12. A process for stabilizing fats and oils as defined in claim 7 wherein the antioxidant is 2,2'-isobutylidenebis (4-n-butoxy-6-propenylphenol).

13. Stabilized fats and oils containing from about 0.005 percent to about 0.05 percent by weight of a synergistic acid selected from the group consisting of citric acid, tartaric acid, phosphoric acid, ascorbic acid, alanine and cysteine and from about 0.001 percent to about 0.1 percent by weight of an antioxidant selected from those having the following formula:

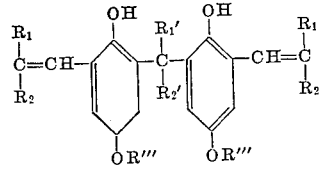

wherein each of $R_1$ and $R_2$ represents a member selected from the group consisting of an H atom, a methyl and an ethyl radical, each of $R_1'$ and $R_2'$ represents a member selected from the group consisting of an H atom and a lower alkyl radical containing from 1 to 6 carbon atoms, and each $R'''$ represents an alkyl radical containing from 1 to 6 carbon atoms.

14. Stabilized fats and oils containing from about 0.005 percent to about 0.05 percent by weight of citric acid and from about 0.001 percent to about 0.1 percent by weight of an antioxidant selected from those having the following formula:

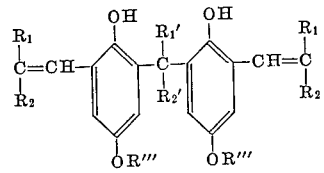

wherein each of $R_1$ and $R_2$ represents a member selected from the group consisting of an H atom, a methyl and an ethyl radical, each of $R_1'$ and $R_2'$ represents a member selected from the group consisting of an H atom and a lower alkyl radical containing from 1 to 6 carbon atoms, and each $R'''$ represents an alkyl radical containing from 1 to 6 carbon atoms.

15. Compounds having the following formula:

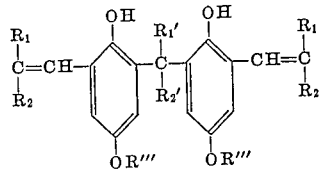

wherein each of $R_1$ and $R_2$ represents a member selected from the group consisting of an H atom, a methyl and an ethyl radical, each of $R_1'$ and $R_2'$ represents a member selected from the group consisting of an H atom and a lower alkyl radical containing from 1 to 6 carbon atoms, and each $R'''$ represents an alkyl radical containing from 1 to 6 carbon atoms.

16. 2,2'-methylenebis (4-methoxy-6-propenylphenol).

17. 2,2'-isobutylidenebis (4-methoxy-6-propenylphenol).

18. 2,2'-isobutylidenebis (4-isopropoxy-6-propenylphenol).

19. 2,2'-n-butylidenebis (4-methoxy-6-propenylphenol).

20. A process for preparing compounds which have the following formula:

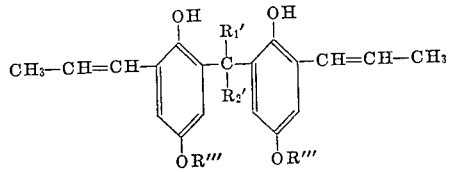

wherein each of $R_1'$ and $R_2'$ represents a member selected from the group consisting of an H atom and a lower alkyl radical containing from 1 to 6 carbon atoms and each $R'''$ represents an alkyl radical containing from 1 to 6 carbon atoms which comprises reacting a compound having the following formula:

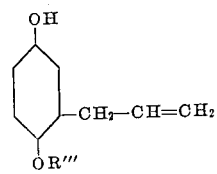

(wherein $R'''$ is defined above) and a compound selected from the group consisting of aliphatic aldehydes and ketones dissolved in an inert solvent selected from the group consisting of benzene, toluene and xylene in the presence of a catalytic amount of an inorganic acid condensing agent and a trace amount of a mercapto acid at a temperature of from about 0° C. to about 80° C. followed by separation of a compound having the following formula:

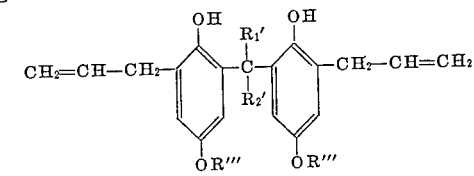

(wherein each of $R_1'$, $R_2'$ and $R'''$ are defined above) and then treating this compound in an aqueous solution of an alkali metal hydroxide containing a catalytic quantity of a tertiary hydroxyamine at an elevated temperature under an inert atmosphere until isomerization results, followed by separation of the desired product.

No references cited.